(No Model.) 2 Sheets—Sheet 1.
J. BALSLEY.
CLAMPING DEVICE FOR SAW TABLES.
No. 418,936. Patented Jan. 7, 1890.
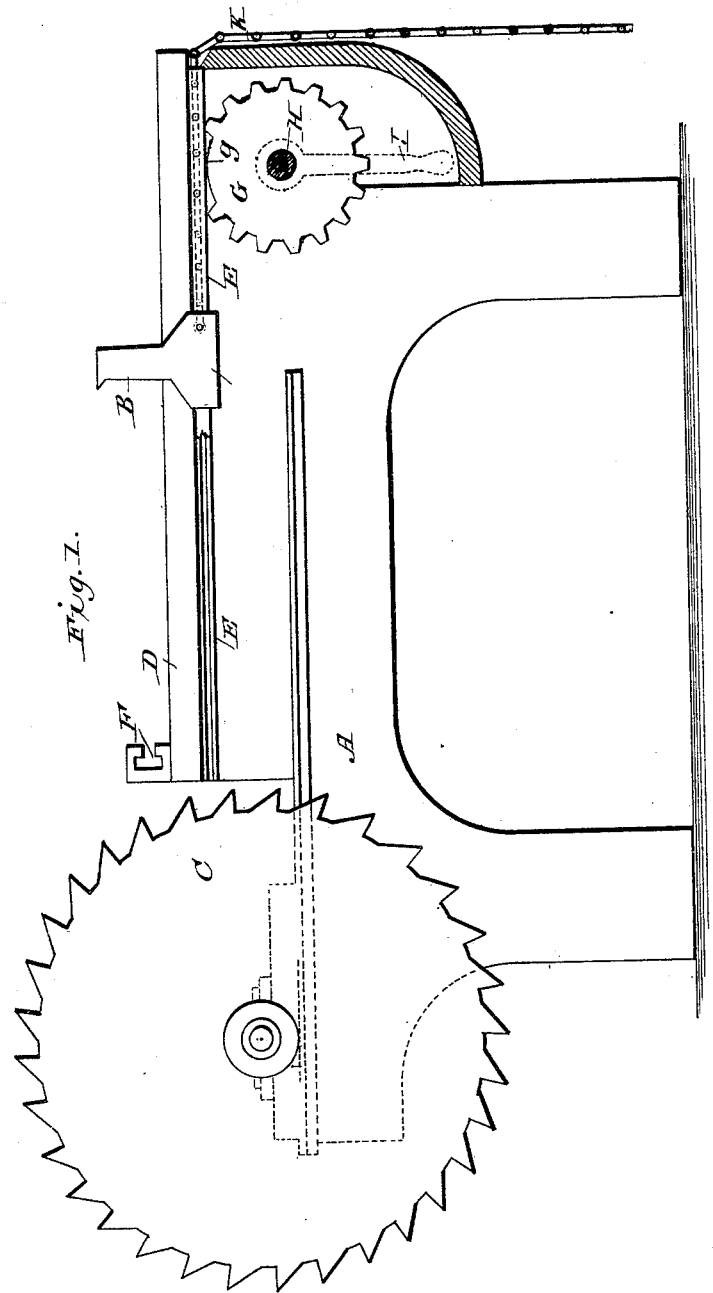
WITNESSES:
Fred G. Dieterich
Jos. A. Ryan
INVENTOR
Joseph Balsley
BY
ATTORNEY

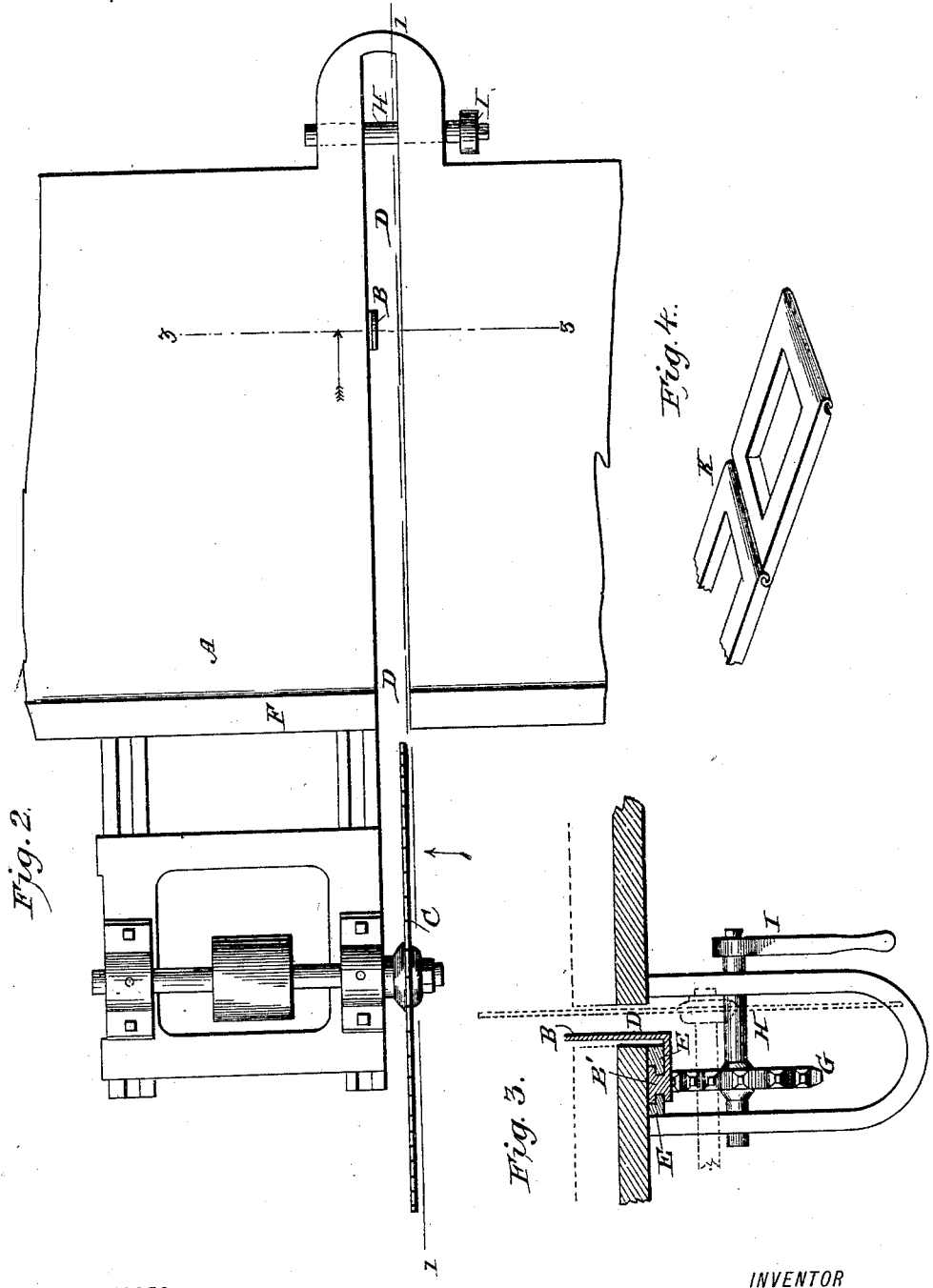

though this present application is a division of said application.

UNITED STATES PATENT OFFICE.

JOSEPH BALSLEY, OF SEYMOUR, INDIANA.

CLAMPING DEVICE FOR SAW-TABLES.

SPECIFICATION forming part of Letters Patent No. 418,936, dated January 7, 1890.

Application filed June 28, 1889. Serial No. 315,959. (No model.)

*To all whom it may concern:*

Be it known that I, JOSEPH BALSLEY, residing at Seymour, in the county of Jackson and State of Indiana, have invented a new and Improved Clamping Device for Saw-Tables, of which the following is a full, clear, and exact description.

My invention consists in a new and improved clamping device for saw-tables, which will be hereinafter fully described and claimed.

Referring to the accompanying drawings, Figure 1 is a longitudinal vertical sectional view on line 1 1, Fig. 2. Fig. 2 is a plan view. Fig. 3 is a vertical transverse sectional view taken on line 3 3, Fig. 2; and Fig. 4 is a detail view of the chain K.

The same letters of reference indicate corresponding parts in all the figures.

The object of my invention is to provide a clamp for a saw-table that can be instantly adjusted to any width of lumber and will securely hold the lumber while the saw is cutting it.

Referring to the several parts by letter, A indicates the saw-table, which is formed with the slot D, through which the blade of the revolving saw passes as it travels across the table to cut the lumber.

C indicates the circular saw, which travels on its carriage beneath and across the table A in the usual well-known manner, the saw with its supports being old and forming no part of my invention.

Beneath the table, at one edge of and parallel with the slot D, are secured the guide-strips E, between the grooved edges of which fits and slides the recessed base B' of the movable stop B. The stop B then extends up vertically above the top of the table at that edge of the slot D, as shown in the drawings.

In the grooved guide E fit and slide the wide flat links of a sprocket-chain K, one end of which is secured to the recessed base of the movable stop B. This chain passes out through the grooved guide E at the front edge of the table, passing over a sprocket-wheel G, secured on a shaft H, which is mounted in a suitable bearing under the table, as shown, and which has on one end a hand-lever I.

Upon the edge of the table A, next to the saw, is secured a stationary flange-strip F.

When a piece of lumber is placed upon the table A to be cut, one edge rests against the stationary flange F at the rear side of the table and the stop B is moved until it presses against and firmly clamps the piece of lumber. In order to permit of the stop being moved back and forth across the table independently of the wheel G and lever I, to quickly adjust it, slide it by hand to suit different widths of lumber. A few of the cogs on the sprocket-wheel G are removed at *g*, thus allowing the chain K to pass over the wheel G without engaging with its teeth, and when the stop B is moved to within an inch or two of the lumber the operator raises the lever I, when the cogs of wheel G engage with the links of chain K and force the stop B against the lumber.

From the foregoing description, taken in connection with the accompanying drawings, the construction and operation of my invention will be readily seen.

My invention secures the operator against any possibility of accident, and also prevents the saw from being broken, both of which frequently occur where no clamp is used.

With my invention any size piece of timber, from a stick one-half inch square up to a piece as large as the table and saw will take, can be held firmly and securely in position while being cut. The timber while being cut may close in on and stop the saw, but the clamp holds it in position and no accident results; also, the operator while holding the lever I is at a safe distance from the saw, and there is consequently no danger of his being hurt.

The stop B may be operated by a hand-wheel to be used in place of the lever I, and none of the cogs of the wheel G will then be removed; but the wheel would be more in the way than the lever. Also, the stop may be operated by power from the shafting-connection with the table.

I only make a claim herein for the specific combinations recited in my present claims, as the combination of a slotted table having a stationary edge flange, a grooved guide, a movable stop having a recessed base, and means for moving the same back and forth in said guide-groove, said means consisting of a sprocket-chain secured at one end to said stop, and a sprocket-wheel for operating said chain and stop, forms part of the subject-matter and claims embodied in an application for Letters Patent filed by me October 31, 1889, Serial No. 328,779, for improvements upon the present invention.

Having thus described my invention, what I claim, and desire to secure by Letters Patent, is—

1. The combination, with a slotted saw-table having a stationary edge flange, of the grooved ways E, the stop B, having the recessed base, the chain K, and a sprocket-wheel engaging with said chain and mounted on the shaft H, having the hand-lever I, substantially as set forth.

2. The combination, with a slotted saw-table having a stationary edge flange, of the grooved guideways E, the stop B, having the recessed base, the chain K, the mutilated sprocket-wheel G, shaft H, and hand-lever I, substantially as set forth.

JOSEPH BALSLEY.

Witnesses:
   PHILIP LAUGEL,
   WILLIAM F. PETER.